Oct. 27, 1953   J. A. COLE   2,656,758
OPTICAL VIEWER
Filed Jan. 25, 1950   5 Sheets-Sheet 1
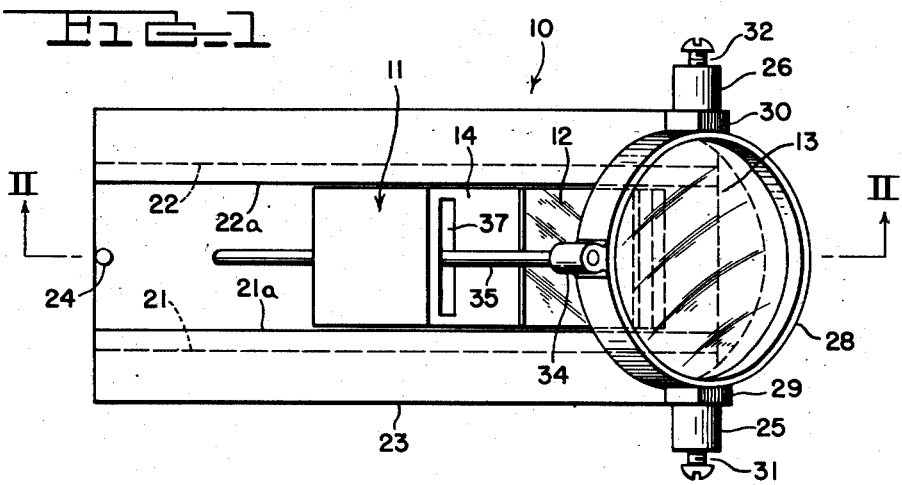
INVENTOR.
JANEY A. COLE
BY John B. Armentrout
HIS ATTORNEY Oct. 27, 1953          J. A. COLE           2,656,758
                      OPTICAL VIEWER
Filed Jan. 25, 1950                      5 Sheets-Sheet 2

INVENTOR.
JANEY A. COLE
BY John B. [signature]

HIS ATTORNEY

Oct. 27, 1953
J. A. COLE
2,656,758
OPTICAL VIEWER
Filed Jan. 25, 1950
5 Sheets-Sheet 3
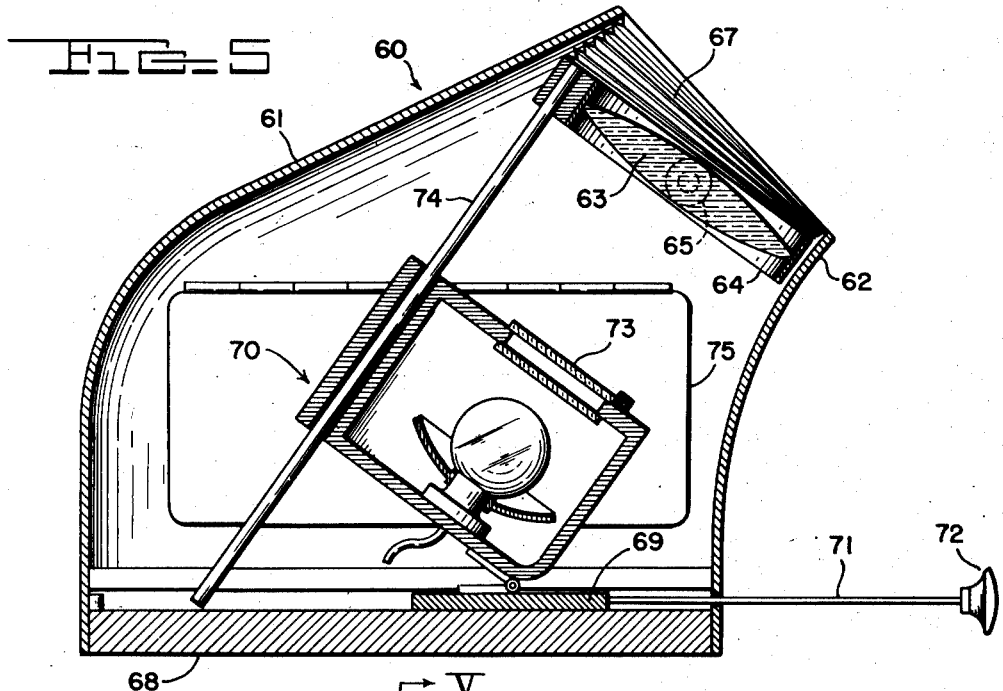
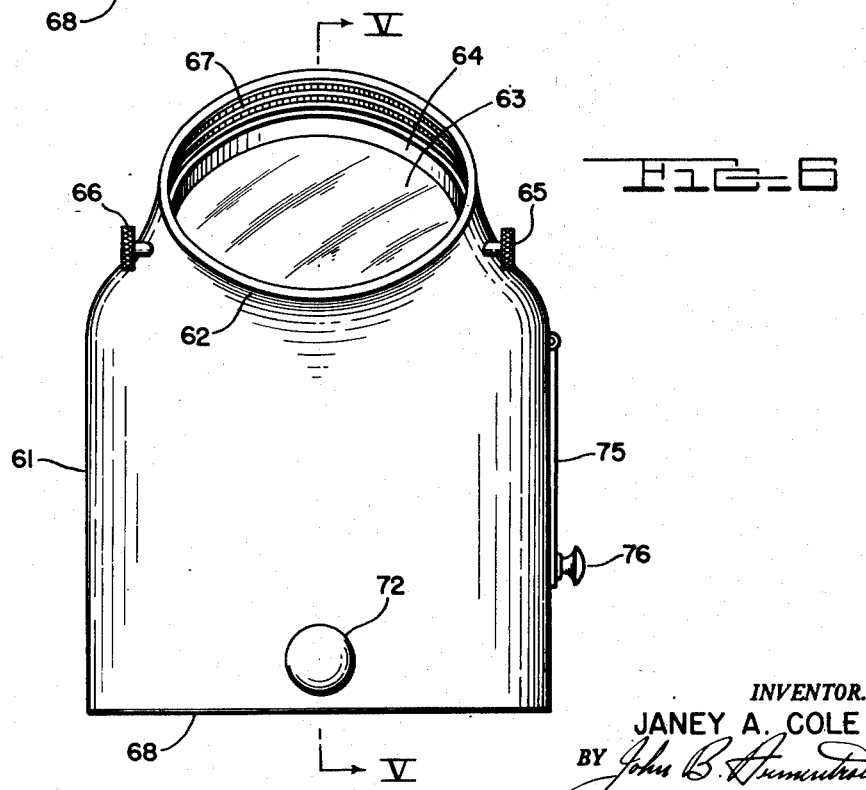
INVENTOR.
JANEY A. COLE
BY John B. Brumentrout
HIS ATTORNEY Oct. 27, 1953  J. A. COLE  2,656,758
OPTICAL VIEWER
Filed Jan. 25, 1950  5 Sheets-Sheet 4

INVENTOR.
JANEY A. COLE
BY John B. Hummertraut
HIS ATTORNEY

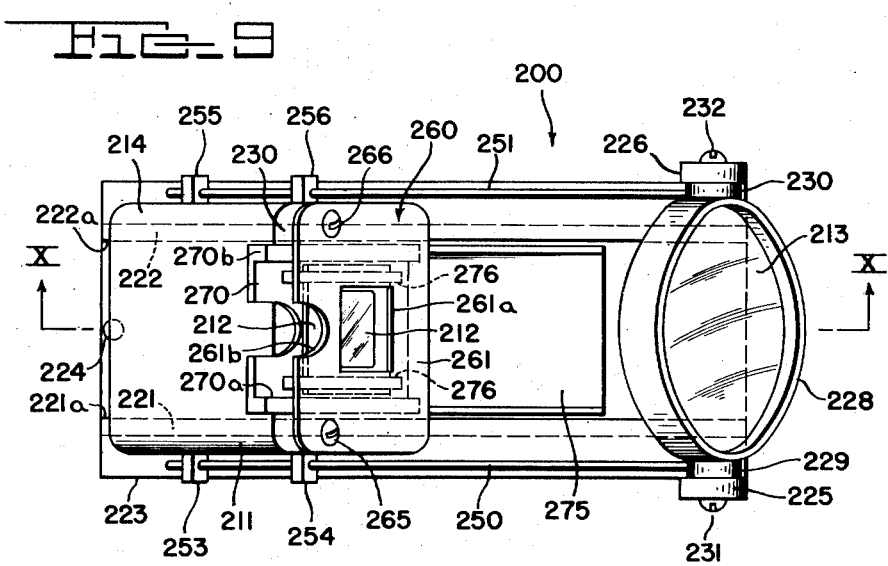

Patented Oct. 27, 1953

2,656,758

UNITED STATES PATENT OFFICE 2,656,758

OPTICAL VIEWER

Janey A. Cole, Chicago, Ill.

Application January 25, 1950, Serial No. 140,363

15 Claims. (Cl. 88—29)

This invention relates to optical apparatus, and more particularly to optical viewing devices.

An object of my invention is the provision of a simple, practical and reliable optical viewing device which is amenable to focusing.

Another object of this invention is the provision of an illuminated optical viewer which has adjustability for giving definition and clarity of image, thus better to meet particular demands of the eyes of the user.

A further object of my invention is the provision of an easily focused inexpensive optical device which gives satisfactory optical alignment throughout the several focusing positions.

A still further object of my invention is that of providing an optical device of the character indicated, for viewing such articles as picture films which are pervious to light.

Other objects in part will be obvious and in part pointed out more fully hereinafter.

The invention accordingly consists in the combination of elements, and in the features of construction and operation, the scope of the application of which is indicated in the following claims.

In the accompanying drawing representing certain embodiments of my invention:

Figure 1 is a top view of an optical viewer having features in accordance with my invention;

Figure 2 is a side elevation of the same viewer;

Figure 7:
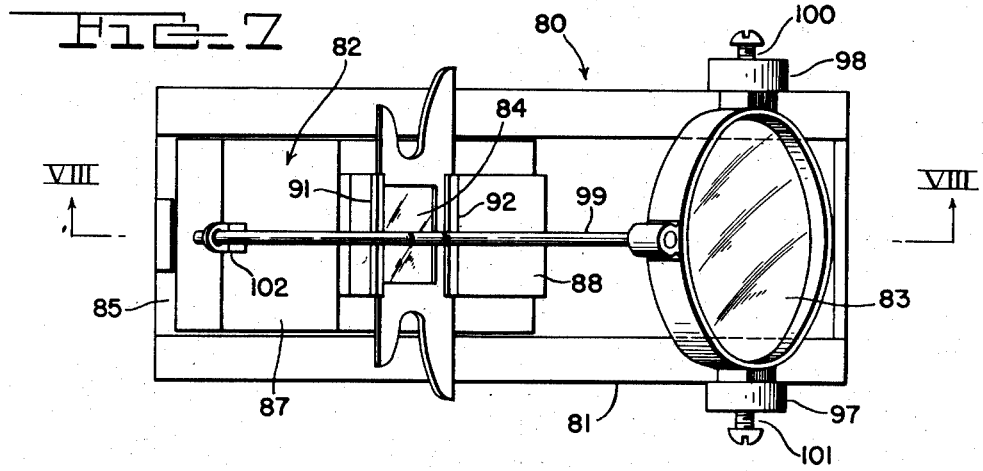
Figure 8:
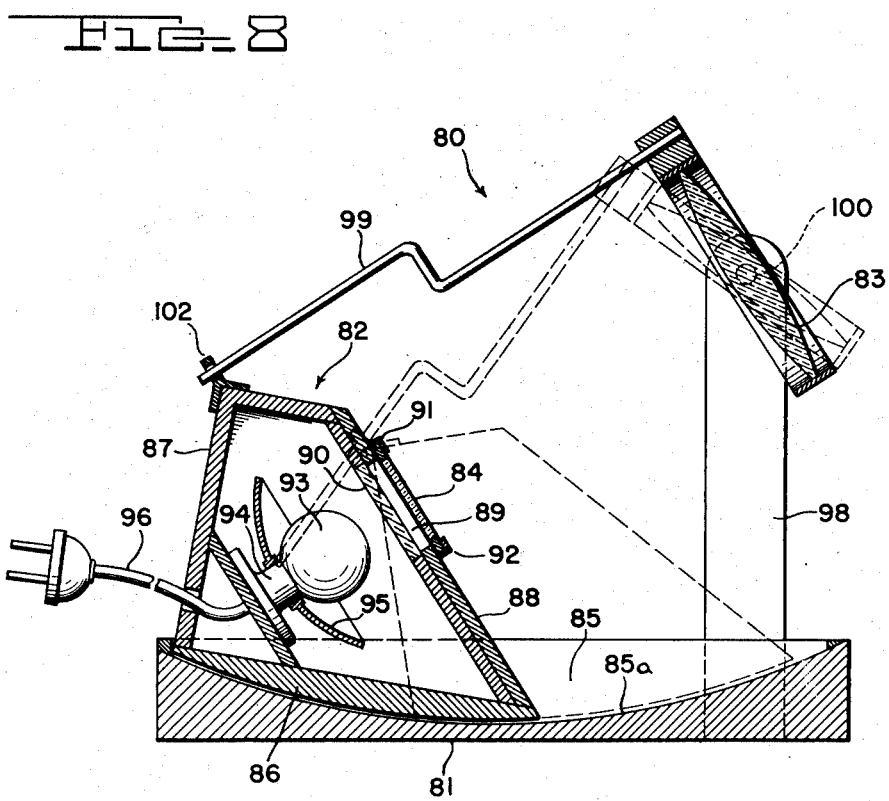

Figures 5 and 6 respectively represent side and front elevations of another optical viewer made in accordance with my invention;

Figures 7 and 8 respectively are a top view and side elevation of a still further optical viewer which I provide; and Figures 9 and 10 are respectively a top view and a side view of another optical viewer made in accordance with my invention.

As conducive to a clearer understanding of certain features of my invention, it may be noted at this point that optical viewers have come into widespread demand for such purposes as the observation of objects under magnification. A popular class of these viewers, for example, introduce the feature of illumination, especially where the object to be shown is pervious to light. Many of the viewers are equipped with a source of light behind the zone occupied by the pervious object, and thus afford illumination and facilitate observation of the object from the side opposite the light source.

A growing popularity of miniature-size color or black and white photographs or transparencies for example has brought into the market various types of viewers, as for illuminating and magnifying the tiny pictures. For those who have a number of film or picture transparencies and wish to show them without going to the trouble of setting up a projector and a screen, a viewer is a convenient instrument. In other instances, some of the viewers are useful in the medical or dental profession for the magnification and study of X-ray pictures, such as of the small size black and white film type so well known today in dentistry.

While many needs exist for optical viewers, difficulty has heretofore been encountered from the standpoint of focusing. For obtaining clear and definite images of the pictures shown, it becomes desirable to adjust the viewing devices. The matter of focusing an optical viewer, however, heretofore usually has introduced more than warranted expense of construction where satisfactory durability of the instrument and reliable optical alignment of the optical system had to be assured. There have been instances too where reliable optical alignment and other important features of the viewers have been sacrificed, to great detriment, for the sake of achieving relatively inexpensive focusing instruments.

An important object of my invention accordingly is the provision of a durable and reliable magnifying optical viewer such as for pictures, slides or films, which viewer embodies a simple, inexpensive and highly satisfactory focusing system, for maintaining good optical alignment with change of focusing position to give a clear image.

It can be said that a properly lighted focusing viewer with the correct optical parts, will show transparencies more clearly than any other device. First: The luminosity range is very long. This gives a wide contrast between the lightest and darkest areas of the film and all the gradations in between, with real life-like effects. Secondly: Many persons who have postponed getting glasses or having a refitting because of slight need for correction will find, in a focusing viewer, whatever correction is needed and will be able to see the objects on view with unaccustomed sharpness.

Figure 3:
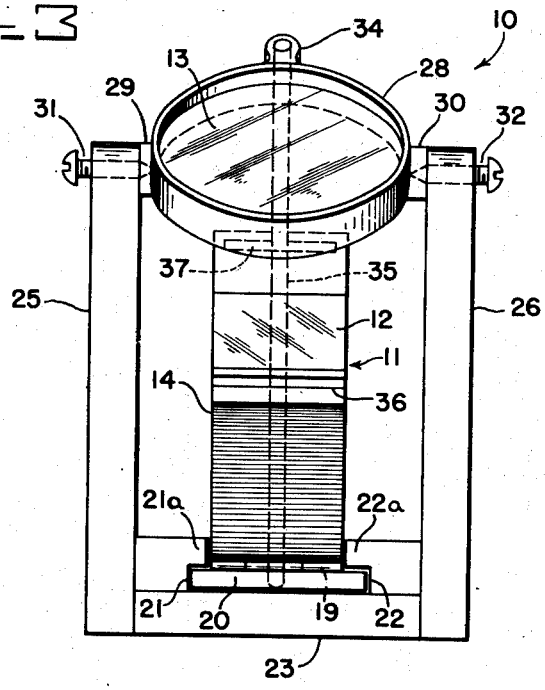
Figure 3 represents the optical viewer in front elevation.

Referring now more particularly to an embodiment of my invention, I provide an optical viewer 10 (see Figures 1 to 3 inclusive) which comprises optical means for producing an image, this optical means for example including a convex, magnifying objective lens 13 with or without additional lenses, prisms or other portions such as to form an eye-piece. An upright portion of the optical viewer, such as standards 25 and 26 disposed in substantially parallel spaced relation to each other and fastened at their lower ends to one end of a support or base 23 of the viewer, illustratively affords pivotal connection for the objective lens 13. The lens for example has its rim fixed in a frame 28, the latter having diametrically opposite bearing portions 29 and 30 which conveniently provide concave bearing surfaces at their ends. Pivot screws 31 and 32 extending laterally through the upper ends of standards 25 and 26, adjustably enter the concavities of portions 29 and 30 to support the lens 13 and frame 28 and provide a pivotal axis or line of rotation for tilting the lens.

My optical viewer 10 comprises carrier means 11 for displaying an object of view toward the image-producing optical means. The carrier means in this instance is suited for movement along a substantially straight path to different distances of focus of the image-producing optical means on the object, and may be tilted along a line which is transverse to the path and substantially parallel to the axis of tilt of the optical means, for optically aligning the object.

For assuring the substantially straight path movement, the optical viewer 10 includes guide means. The guide means has a portion which forms a substantially straight path or channel for guiding the carrier means, and thus the object of view supported by the latter, to different positions in distance beneath and away from the optical means. The path-forming portion of the guide means extends along the length of the base 23 and for example includes substantially parallel spaced guides 21 and 22 which are so fastened to the top of the base as to form a substantially straight channel therewith. This channel extends in a direction which is substantially at right angles to the axis of tilt of lens 13, as from between the standards 25 and 26 toward the outer or back end of the base 23. Of course, if desired, the path-forming portion of the guide means may be a unitary portion such as a channel mounted on top the base 23 and extending along the length of the latter.

In the present instance, the guide means also includes a follower 20, which for example is a block for sliding along the substantially straight path as directly on top the base 23 and between the guides 21 and 22. The follower 20 advantageously is restrained against escape from its guided course by overlying projections or legs 21a and 22a of the guides. A stop 24 at the outer or back end of base 23 prevents escape of the follower past the outer or back ends of the guides.

Where the image to be produced is that of a light-pervious object 12 such as a photographic slide or film, the carrier means 11 preferably includes an illuminating box 14. This box 14 conveniently is provided with a hinge 19 along its lower back edge, the hinge having one leaf connected to the box and the other leaf connected to the follower 20 for tilting the box about a line which is transverse or substantially at right angles to the path of guidance of the follower.

The illuminating box 14 as with the aid of a front ledge 36, holds the light-pervious object 12 to illuminated position over an opening 15 in the box wall and for tilting with the box about hinge 19 to different positions of view through the lens 13. Opening 15 advantageously is covered by light-diffusing means behind the object, illustratively by a plate of opalite glass 15a suitably secured at its edges to the inside surface of the illuminating box. Light conveniently is supplied by a bulb 16 which illustratively is held to position immediately behind the opening 15 by a socket 17 which is supported to the inside surface of the illuminating box. A reflector 18 preferably is used behind the bulb for directing the light to the diffusing plate 15a and through the light pervious object. Suitable electrical leads (not shown) conveniently extend from the socket and through the illuminating box for connecting the bulb with a source of electrical power.

Connecting means between the carrier means and the optical means keeps the tilting thereof in unison, and maintains substantial optical alignment of the optical means with the object with variation of the object distance. In this for example, the optical center of the lens 13 is kept in alignment with the center of the opening 15 or maintains some other suitable average position relative to the objects to be observed. To preserve this relative position and also to enable focusing, I find advantage in using slide means such as an alignment arm 35 for interconnecting the lens 13 and box 14. The arm for example is fixed at one end of the lens frame 28 as in a lug 34 projecting from the frame at a point which for example is about 90 degrees removed from the lens pivot screws 31 and 32. This lug conveniently has a bore which for example receives the upper end of arm 35 and holds the same fixed to position by press fit. The arm illustratively is inclined backward and downward from the lens frame and is free to slide in a slot or bore 37 reaching from front to back through the top of the illuminating box 14 of the carrier 11.

In viewing the flat objects such as the light-pervious object or transparency 12, the carrier 11 and lens 13 preferably are so interconnected by the arm 35 as to keep the plane of the object substantially parallel to the plane of the rim of the lens. This relative parallelism advantageously prevails through different positions of focus achieved by varying the distance between the lens and the object. The latter distance is varied by displacing the slide 20 along the guides 21 and 22, such as to the dotted line position corresponding to the position D of the viewer 10 in Figure 2. While the slide 20 is approaching its dotted line position from the full line position shown, the illuminating box 14 and accordingly the object 12 supported on the box turn clockwise about the hinge 19. At the same time, with movement of the box 14, arm 35 slides along the slot 37 and is raised through a clockwise rotation with the frame 28 and lens 13 on pivots 31 and 32. Stop 24 is effective for arresting movement of slide 20 farther to the left in Figure 2 than say beyond the dotted line position. The slide, however, may be moved back to the right until for example the lower end of arm 35 contacts the base 23 to act as a stop against continued movement in this direction. At any of the many possible settings of the slide 20 for focusing, the plane of the rim of the lens 13 and the plane of the flat object remain substantially parallel and in optical alignment.

Figure 4:
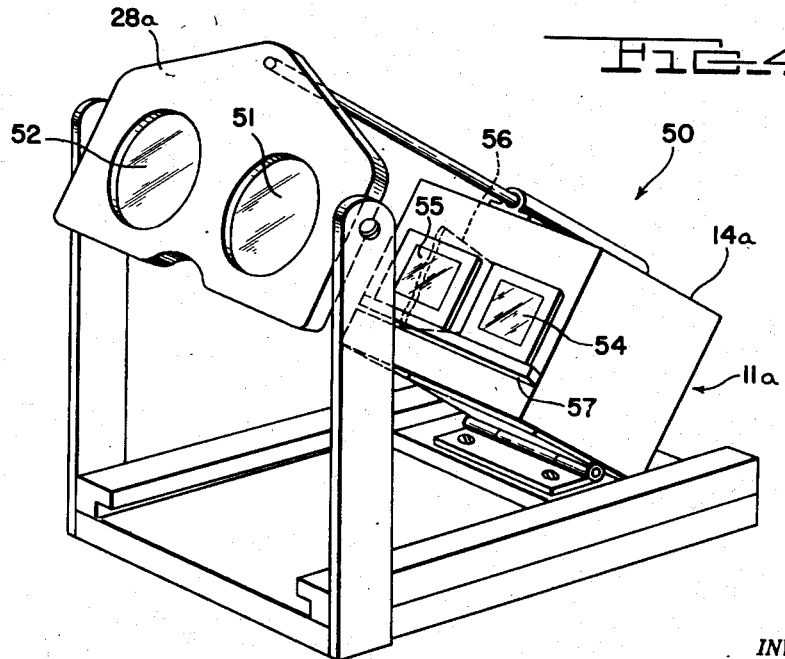
Figure 4 depicts another embodiment, this being a stereoscopic optical viewer, shown in perspective.

In a somewhat different embodiment of my invention, I provide a stereoscopic viewer 50 (represented in Figure 4 of the drawing) having carrier means 11a and a lens frame 28a. This frame illustratively carries two lenses 51 and 52, these being side by side and individually corresponding to the right and left eyes of an observer. An illuminating box 14a of the carrier means 11a, has in effect two windows through the front thereof for the outlet of light to a right eye object component 54 and to a left eye object component 55 which correspond for stereoscopic blending as respectively viewed through the objective lenses 51 and 52. There is a ledge 57 on the box 14a for receiving and holding the several object components to position over the light windows. A partition 56 conveniently is used outside the box 14a and between the components of the object to assure separate view through the lenses. All other features of the stereoscopic viewer 50 illustratively are the same as those described in connection with the viewer 10, this including the features of construction for focusing and optical alignment.

Sometimes the optical viewer which I provide includes means for enclosing the space between the lens and the object to be viewed, such as to prevent the entrance of light from external sources. In this connection, reference is had to Figures 5 and 6 of the drawing wherein there is represented an optical viewer 60 having a casing 61. The casing 61 conveniently provides a throat 62 in which the frame 64 of an objective lens 63 is pivotally mounted on its diameter as by set screws 65 and 66 in the casing wall. An annular bellows 67 preferably is used to close off the space between the lens frame and the casing throat and advantageously is made of a light-impervious material if the entrance of light to inside the casing is to be excluded. A bottom or base 68 of the casing 61 conveniently supports and affords guides for a follower or slide block 69 to give a straight path of movement. Hinged to the slide is carrier means 70 including an illuminating box, and this box is connected with the lens frame 64 by arm 74 for tilting with the lens 63 and frame in accordance with the principle of focusing and alignment already described in connection with the optical viewer 10. The slide 69 conveniently is moved along its guided path for controlling focus, by means of a plunger 71 extending through the front of the casing 61 and having an external knob 72 for easy manual operation.

With this particular arrangement, the plunger is manually operable to move the block and thus effect desired focal adjustment of the optical system of the viewer. The casing 61 advantageously has a hinged door 75 for ready access to an object 73 which has been exposed to view, and for example is long enough to permit this access no matter what position of the slide 69 and carrier 70 has been selected for focus. The door, for example, is biased, as by means of a suitable spring, to closed position such as to exclude light from the outside and includes a knob 76 or the like on the outside to facilitate opening against the spring action.

An optical viewer 80 (see Figures 7 and 8), having features in accordance with my invention, comprises a base or support 81, and carrier means 82 which is slidable along a curved path and cofunctions with an arm 99 to maintain substantial alignment of an objective lens 83 and an object 84 in the viewer 80 throughout different positions of focus. The support or base 81 conveniently affords guide means including a channel 85, the channel having a curved bottom 85a which is concave downward. An illuminating box 87 of the carrier means 82 fits in this channel and thus is guided to different positions of tilt along the length of the latter, bottom 86 of the box for example including a follower portion of the guide means, this portion being curved from front to back so as to be convex and conform to the channel bottom. A wall 88 of the illuminating box 87 has an opening 89 therethrough, closed over by a light diffusing screen or plate 90 which is suitably held in place against the inside surface of the box wall. On the outside of this wall, and adjacent to the openings 89 are upper and lower rails 91 and 92 for slidably receiving the object 84 and keeping the same over the opening during the viewing operation. A source of light including a light bulb 93, a socket 94 for the bulb, and a reflector 95, is mounted inside the box 87 in satisfactory position for providing light to the opening 89 and thus to the object 84. Suitable electrical leads, as in the form of an extension cord 96, conveniently serve for supplying current from an outside source through the box wall to the socket.

Standards 97 and 98 for example are provided for supporting the objective lens 83. These standards illustratively are rigidly fastened at their lower ends to opposite sides of one end of the support or base 81 and extend upward in substantially parallel relation in front of the carrier means 82. Objective lens 83 is fixed in a suitable frame which is pivotally mounted by set screws 100 and 101 in the standards, for tilting on a diameter which is transverse to the position of support of the object 84 while confronting the object. Arm 99 extends from rigid connection with the lens frame to sliding connection with the carrier means 82. The latter connection is conveniently provided by means of a lug 102 attached to the illuminating box 87. This lug for example extends upward and backward from the rear edge of the top of the box and has a hole for receiving and guiding the arm. The arm maintains the objective lens 83 substantially parallel to the plane of the object 84 or otherwise suitably aligned with the object, and the curvature of the bottom of channel 85 is sufficient for substantially preserving this alignment when the position of the carrier means 82 is changed along the channel. The movement of the carrier means to a different position by sliding along the channel causes the illuminating box to tilt. At the same time the arm 99 slides through the lug 102 and moreover causes the lens 83 to tilt a substantially like amount for preserving alignment although the actual distance between the lens and object are changed in sliding the carrier means 82 along the base on support 81. A representation of two particular settings of the receiver 80 is given in Figure 8, one of these positions being shown by full lines and the other by dotted lines.

As an alternative in the optical viewers which I provide, the connector means for keeping the tilting of the object carrier and lens in unison, extends from levering connection with the lens, on substantially direct radius from the axis of tilt of the latter, to slidable connection with the object carrier. Thus, for example, in the embodiment of my invention represented in Figures 9 and 10, I provide an optical viewer 200 having an objective lens 213 pivotally disposed between standards 225 and 226, the lower ends of these standards being rigidly fastened to the opposite sides of one end of a base or support 223. Pivot screws 231 and 232 extending laterally through the upper ends of the standards 225 and 226, and toward each other, adjustably enter concavities in hubs 229 and 236, these hubs for example being diametrically opposed extensions of an annular frame 228 which receives and holds the lens 213. Carrier means 211 for a light-pervious object 212, this means being disposed behind the lens, advantageously includes illuminating box 214.

A front wall 230 of the illuminating box has an opening 230a therethrough for the egress of light from a suitable source such as a bulb, reflector and socket assembly 233 inside the box, the bulb conveniently being energized through leads 231 extending from the socket to outside the box. A sheet of opalite glass 232 or other light diffusing means advantageously covers the opening 230a, such as by being mounted to the inside surface of the front wall 230. The opening 230a is large enough to admit light to the transparent object 212 which is disposed outside the front wall 230 for view through the objective lens 213.

The carrier means 211 is supported on a guide follower 210 for moving along a substantially straight line path at about right angles to the axis of tilt of the objective lens 213. This path is conveniently formed with the base 223 by substantially parallel guides 221 and 222 mounted on top the latter, giving a straight channel directed at about right angles to the axis of tilt of the objective lens. The guides advantageously include respective flanges 221a and 222a which extend toward each other above the top surface of base 223 so as to confine the guide follower 210 against escape upward from the channel. A stop 224 at the back end of the base arrests longitudinal escape of the guide follower from the channel.

The illuminating box 214 is interconnected, as by a hinge 219 at the back lower edge, for tilt relative to the guide follower. The axis of tilt of the box is substantially parallel with the axis of tilt of the objective lens. Guide rods 250 and 251 slidably interconnected the objective lens 213 and the object carrier means 211 for keeping the respective tilts of the lens and carrier means in unison and the lens optically aligned with the object. These rods extend substantially radially from the axis of tilt of the lens to beside the illuminating box 214. In this for example, rods 250 and 251 have their upper ends respectively fast to the hubs 229 and 230 for rotating with the same in the manner of spokes. The lower portion of rod 250 is slidable in spaced guides 253 and 254 fast to one side wall of the illuminating box 214, and the lower portion of rod 251 is slidable in spaced guides 255 and 256 fast to the opposite box wall. The several guides for the rods illustratively are in the form of posts having aligned openings for slidably receiving the rods.

The guide follower 210 thus can be moved in a substantially straight path along base 223 and between guides 221 and 222. This alters the distance of illuminating box 214 from the lens 213 and accordingly changes the object distance. The guide rods 250 and 251 meanwhile slide relative to their respective guides 253, 254, 255 and 256, to preserve optical alignment of the objective lens and the object within satisfactory limits, and in this the illuminating box and lens tilt in unison about their respective axes of tilt. It will be appreciated that the substantial radial relation of the rods 250 and 251 to the axis of tilt of the lens makes for smooth operation because the rods lever substantially directly on center of rotation. If desired, one or the other of the rods 250 and 251 may be omitted, leaving the other to maintain alignment of the lens and object with change of the object distance as hereinbefore described.

For supporting the object 212 in viewing position, such as where the object is a photographically exposed, transparent picture film mounted in the usual frame of cardboard or the like for handling and rigidity, the carrier means preferably includes an object-feed-object holder 260. This particular holding means illustratively comprises a guide plate 270 having opposite sides or flanges 270a and 270b for guiding the object to viewing position in the front of the box wall opening 230a. The guide plate preferably is affixed to the front wall 230 of the illuminating box, and itself has an opening sufficiently large for the egress of light to behind and through the object. Sides or flanges 270a and 270b preferably are at about right angles to the main portion of guide plate 270, so as to form an open channel therewith. A frontal plate 261, having a window 261a therein, for displaying the object to view behind and through the objective lens 213 is mounted to the wall 230 of the illuminating box 214 so that the window 261a is directly in front of the box opening 230a and the opening in plate 270. The frontal plate advantageously is held to position by spaced fastening bolts 265 and 266 which extend through holes in the front wall 230 outside the flanges 270a and 270b and individually receive coil springs 268, the latter seating against the inside surfaces of the box front wall 230. Nuts 267 are on the inner ends of the bolts to hold the springs compressed so that the frontal plate is mildly urged toward the object guide plate 270. The frontal plate preferably has two spaced presser feet 276 attached thereto so that those feet are urged to contact and hold the border of the object, such as the object frame, in accordance with force supplied from the compressed springs 268.

The guide path for the object, afforded by plate 270 and its sides or flanges 270a and 270b, preferably is substantially vertical, so that an object 212 may be introduced at the top end of the path and pushed down between this plate and the presser feet 276 to bring that portion of the object which is to be viewed to position behind the plate window 261a. This positioning is facilitated for example by a finger groove 261b in the top edge of the frontal plate and by a corresponding groove in the guide plate 270. Guide plate 270 advantageously protrudes above the frontal plate 261, and the upper ends of the presser feet 276 occupy positions between the uppermost edges of the guide plate and the frontal plate, to facilitate insertion of the object for view. Once the object 212 has been viewed through the lens 213 another object for view is introduced at the top to the guide plate 270, thus displacing the first object downward to clear the presser feet 276 and fall clear of the guide path. The lower ends of presser feet 276 for example are above the lower edges of the plates 261 and 270 to give earlier release of the ejected object.

The optical viewer 200 preferably includes means for delivering viewed objects to position for recovery, this means illustratively being an inclined trough or chute 275 having its upper end hinged at 277 to the underneath side of the illuminating box 214 and its lower end forward and slidable along the top surface of the viewer base between the follower guide portions 221a and 222a. The chute or trough receives the objects which drop from the lower ends of plates 261 and 270, and by virtue of being inclined feeds the objects by gravity to position for convenient recovery.

Thus, it will be seen that in this invention, I provide optical viewing apparatus wherein the various objects of invention noted herein together with many thoroughly practical advantages are successfully achieved. It will be seen that the apparatus is readily focused to any of a number of positions of use, and that reliable optical alignment is had in these positions. Also, it will be seen that the apparatus embodies highly satisfactory features of operation which are readily achieved on the basis of simplicity of construction.

As many possible embodiments may be made of my invention and as many possible changes may be made in the embodiments hereinbefore set forth, it will be understood that all matter described herein is to be interpreted as illustrative and not as a limitation.

I claim:

1. An optical viewer, comprising, lens means for tilting to image producing positions, carrier means for displaying an object toward said lens means, guide means having a curved guide path and a follower in said path for directing the carrier means to different positions of tilt for tilting the object and changing the distance for focus of said lens means, and means interconnecting the carrier means and the lens means for tilting the latter to maintain substantial optical alignment thereof with the object during the focusing.

2. An optical viewer, comprising, lens means for tilting to image producing positions, carrier means for supporting a light-pervious object toward said lens means and including an illuminating box for supplying light behind and through the pervious object, means for enclosing the space between said illuminating box and lens means against the entrance of light from external sources, guide means having a guide path and a follower for moving along said path to direct the carrier means to different positions in distance for focus of said lens means on the object, said carrier means being rotatably connected with said follower for tilting in the direction of said path to modify the inclination of the object, and connecting means for said carrier means and the lens means to keep the tilting thereof in unison and maintain substantial optical alignment of the lens means with the object during focusing.

3. An optical viewer, comprising, a casing, lens means disposed in an opening through the wall of said casing rotatably connected with the latter for tilting to image producing positions, carrier means inside said casing for supporting a light-pervious object toward said lens means and including an illuminating box for supplying light from behind and through the pervious object, said casing enclosing the space between said illuminating box and lens means against the entrance of light from external sources, guide means having a guide path inside said casing and a follower for sliding along said path to direct the carrier means to different positions in distance for focus of said lens means on the object, said carrier means being rotatably connected with said follower for tilting in the direction of said path to modify the inclination of the object, and connecting means for said carrier means and the lens means to keep the tilting thereof in unison and maintain substantial optical alignment of the lens means with the object during focusing.

4. An optical viewer, comprising a base and a substantially upright portion extending from the same, lens means rotatably supported to said upright portion for tilting about a line of rotation to image producing positions, an illuminating box for supporting a light pervious object and supplying light behind and through the same toward said lens means, guide means including a portion affording a substantially straight guide path extending along said base and a follower portion for sliding along the path to direct said illuminating box to different positions beneath and away from said lens means for focus of the latter on the object, said box being rotatable with respect to said follower portion for tilting in the direction of said path to modify the inclination of the object, and means slidably interconnecting said illuminating box and lens means in optical alignment and rotatable with said lens means to maintain the alignment upon movement of said follower portion along said path.

5. An optical viewer, comprising, a base and a substantially upright portion extending from the same, lens means rotatably supported to said upright portion and having an axis for tilting to image producing positions, an illuminating box for supporting a light-pervious object and supplying light behind and through the same toward said lens means, guide means including a portion affording a substantially straight guide path extending along said base and a follower portion for sliding along said path to direct said illuminating box to different positions beneath and away from said lens means for focus of the latter on the object, said box being rotatably connected with said follower portion for tilting in the direction of said path to modify the inclination of said object, and connecting means extending from levering connection with said lens means, on substantially direct radius from the axis of tilt thereof, to slidable connection with the side area of said illuminating box to keep the tilting of the latter in unison with the lens means and maintain substantial optical alignment of the object with said lens means with variation of the object distance.

6. An optical viewer, comprising, a base and a substantially upright portion extending from the same, lens means rotatably supported to said upright portion and having an axis for tilting to image producing positions, carrier means including an object-feed-object holder for supporting an object to view behind and through said lens means and for ejection by another object to be viewed, guide means including a portion affording a guide channel extending along said base and a follower portion for sliding in said channel to direct the carrier means to different positions beneath and away from said lens means for focus of the latter on the object of view and to dispose the discharge end of said object-feed-object holder directly above said guide channel, said carrier means being moveable to different positions of tilt in the direction of said path to modify the inclination of the object of view, and connecting means for said carrier means and lens means to keep the tilting thereof in unison and maintain optical alignment of the lens means and object of view during focusing.

7. An optical viewer, comprising, a base and a substantially upright portion extending from the same, lens means rotatably supported to said upright portion and having an axis for tilting to image producing positions, carrier means including an object-feed-object holder for supporting an object for view to behind said lens means and for ejection by another object to be viewed, guide means including a portion affording a guide channel extending along said base and a follower portion for sliding along said base in said channel portion to direct said carrier means to positions beneath and away from said lens means for focus of the latter on the object of view and to dispose the discharge end of said object-feed-object holder above said guide channel, said carrier means being rotatably connected with said follower portion for tilting in the direction of said path to modify the inclination of the object of view, means interconnecting said lens means and carrier means to keep the tilting thereof in unison upon said carrier means being moved toward or away from said lens means and maintain substantial optical alignment of said lens means with the object of view with variation of the object distance, and chute means hingedly connected with said carrier means for conveying the viewed object into said guide channel for recovery.

8. An optical viewer, comprising, a support, optical means including a lens holder and at least one lens therein, said holder and lens being mounted as a unit to said support for tilting with respect to the same on a fixed axis of tilt, carrier means for displaying a light-pervious object to said lens and including an illuminating box for supporting said object and supplying light behind and through the same, guide means including a portion on said support affording a guide path having fixed position relative to the latter and a portion moveable with said carrier means for directing said illuminating box generally toward and away from said lens and the object on a course offset from the fixed axis of tilt of said lens holder and lens, said illuminating box being moveable to different positions of tilt to display the object to said lens, and lever means inclined with respect to said fixed guide path and slidably interconnecting said illuminating box and lens holder and lens unit in optical alignment and rotatable with said lens holder and lens unit about said axis of tilt to maintain the alignment upon said carrier means being moved along said guide path.

9. An optical viewer, comprising, a base and a substantially upright portion rigidly fast to said base, lens means supported above said base to said upright portion and rotatable on an axis of tilt fixed in position with respect to the latter and said base, carrier means for displaying an object to said lens means, guide means including a portion on said base affording a guide path having fixed position relative to the latter and a slide portion moveable with said carrier means along said path to direct said carrier means generally toward and away from said lens means and the object on a course below the level of said fixed axis of tilt of the lens means, and inclined lever means slidably interconnecting said carrier means and lens means in optical alignment and rotatable with said lens means about said axis of tilt to maintain the alignment upon said follower being moved along said guide path.

10. An optical viewer, comprising, a support, lens means mounted on said support for tilting with respect to the same on a substantially fixed axis, carrier means for displaying an object to said optical means, guide means including a portion affording a guide path on said support having fixed position relative to the latter and extending generally toward and away from said lens means and a follower for said path moveable with said carrier means and fully restrained against substantial movement except along said path for directing said carrier means generally toward and away from said lens means and the object on a course offset from the fixed axis of tilt of the lens means, said carrier means being rotatable to various positions of tilt with respect to said follower to display the object to the lens means, and means slidably interconnecting said carrier means and lens means in optical alignment and rotatable with said lens means about said axis of tilt to maintain the optical alignment upon said follower being moved along said guide path.

11. An optical viewer, comprising, a base and a substantially upright portion rigidly fast to said base, optical means including a lens holder and at least one lens therein, said holder and lens being mounted as a unit on said upright portion for tilting with respect to the same on a fixed axis of tilt, carrier means for displaying an object to said lens, guide means including a portion affording a guide path on said base having fixed position relative to the latter and extending generally toward and away from said lens and a follower in said path moveable with said carrier means and fully restrained against substantial movement except along said path for directing said carrier means generally toward and away from said lens and the object on a course below the level of said fixed axis of tilt of said lens holder and lens, said carrier means being rotatable to tilt with respect to said follower to display the object to said lens, and inclined lever means slidably interconnecting said carrier means and lens in optical alignment and rotatable with said lens holder and lens unit about said axis of tilt to maintain the optical alignment upon said follower path.

12. An optical viewer, comprising, a base and a substantially upright portion extending from the same, lens means rotatably supported to said upright portion for tilting about a line of rotation to image producing positions, carrier means for supporting an object to said lens means, guide means including a portion on said base affording a guide path having fixed position relative to the latter and a slide portion moveable with said carrier means for sliding along the path to direct said carrier means to different positions beneath and away from said lens means for focus of the latter on the object, said carrier means being moveable to different positions of tilt in the direction of said path to modify the inclination of the object, and means interconnecting said lens means and carrier means to keep the tilting thereof in unison upon movement of said slide portion along said guide path and maintain substantial optical alignment of said lens means with the object with variation of the object distance.

13. An optical viewer, comprising, a base and a substantially upright portion extending from the same, lens means rotatably supported to said upright portion for tilting about a line of rotation to image producing positions, an illuminating box for supporting a light-pervious object and supplying light behind and through the same to said lens means, guide means including a portion on said base affording a guide path having fixed position relative to the latter and a slide portion moveable with said illuminating box for sliding along the path to direct said box to different positions beneath and away from said lens means for focus of the latter on the object, said box being moveable to different positions of tilt in the direction of said path to modify the inclination of the object, and inclined lever means slidably interconnecting said illuminating box and lens means in optical alignment and rotatable with said lens means to maintain the alignment upon said slide portion being moved along said guide path.

14. A stereoscopic viewer, comprising, a base and a substantially upright portion extending from the same, right and left eye lens means rotatably supported to said upright portion for tilting as a unit about a line of rotation to stereoscopic image producing positions, carrier means for supporting an object having right and left eye components for stereoscopic blending toward said lens means, guide means having relatively movable slide portions respectively on said base and movable with said carrier means affording a guide path for directing said carrier means to different positions of support of the stereoscopic object beneath and away from said lens means for stereoscopic image-producing focus of the latter on the object, said carrier means being movable to different positions of tilt along said path to modify the inclination of the object, and means interconnecting said lens means and carrier means to keep the tilting thereof in unison upon movement of said carrier means along said guide path and maintain stereoscopic optical alignment of said lens means with the object with variation of the object distance.

15. An optical viewer, comprising, a base and a substantially upright portion extending from the same, lens means rotatably supported to said upright portion for tilting about a line of rotation to image producing positions, carrier means for supporting an object to said lens means, guide means having relatively movable slide portions respectively on said base and movable with said carrier means affording a guide path for directing said carrier means to different positions beneath and away from said lens means for focus of the latter on the object, said carrier means being movable to different positions of tilt along said path to modify the inclination of the object, and means interconnecting said lens means and carrier means to keep the tilting thereof in unison upon movement of said carrier means along said guide path and maintain substantial optical alignment of said lens means with the object with variation of the object distance.

JANEY A. COLE.

References Cited in the file of this patent

UNITED STATES PATENTS

| Number | Name | Date |
| --- | --- | --- |
| 268,432 | Powell | Dec. 5, 1882 |
| 1,118,455 | White | Nov. 24, 1914 |
| 1,606,702 | Heitzler | Nov. 9, 1926 |
| 1,612,800 | Brock | Jan. 4, 1927 |
| 1,983,439 | De Vore | Dec. 4, 1934 |
| 2,127,711 | Baldauf | Aug. 23, 1938 |
| 2,204,709 | Straubel et al. | June 18, 1940 |

FOREIGN PATENTS

| Number | Country | Date |
| --- | --- | --- |
| 28,082 | Great Britain | of 1896 |
| 465,516 | France | Feb. 7, 1914 |